(12) United States Patent
Abehassera et al.

(10) Patent No.: US 9,408,041 B1
(45) Date of Patent: Aug. 2, 2016

(54) PREMISE OCCUPANCY DETECTION BASED ON SMARTPHONE PRESENCE

(71) Applicants: Ilan Abehassera, New York, NY (US); Etienne Castanie, Tours (FR); Jocelyn Masserot, New York, NY (US); Dan Attali, New York, NY (US); Olivier Costier, New York, NY (US); Nellie Alimi, San Francisco, CA (US)

(72) Inventors: Ilan Abehassera, New York, NY (US); Etienne Castanie, Tours (FR); Jocelyn Masserot, New York, NY (US); Dan Attali, New York, NY (US); Olivier Costier, New York, NY (US); Nellie Alimi, San Francisco, CA (US)

(73) Assignee: INSENSI, INC.

( * ) Notice: Subject to any disclaimer, the term of this patent is extended or adjusted under 35 U.S.C. 154(b) by 0 days.

(21) Appl. No.: 14/696,297

(22) Filed: Apr. 24, 2015

(51) Int. Cl.
| | |
|---|---|
| H04W 24/00 | (2009.01) |
| H04W 64/00 | (2009.01) |
| H04W 4/04 | (2009.01) |
| H04L 12/26 | (2006.01) |
| G08B 21/18 | (2006.01) |

(52) U.S. Cl.
CPC .............. H04W 4/043 (2013.01); G08B 21/182 (2013.01); H04L 43/10 (2013.01); H04W 64/006 (2013.01)

(58) Field of Classification Search
CPC .. H04W 4/043; H04W 64/006; G08B 21/182; H04L 43/10
See application file for complete search history.

(56) References Cited

U.S. PATENT DOCUMENTS

| | | | |
|---|---|---|---|
| 2009/0165064 A1* | 6/2009 | Gong | H04H 20/103 725/93 |
| 2013/0157684 A1* | 6/2013 | Moser | H04W 4/023 455/456.1 |
| 2014/0282641 A1* | 9/2014 | Fry | H04N 21/44218 725/10 |
| 2015/0161632 A1* | 6/2015 | Humay | G06Q 30/0203 705/7.32 |

* cited by examiner

*Primary Examiner* — Kashif Siddiqui
(74) *Attorney, Agent, or Firm* — Arjomand Law Group, PLLC; Farjam Majd

(57) ABSTRACT

A method and an apparatus are disclosed for dynamically detecting and updating occupancy of a predefined space based on the presence of smartphones carried by people. In some embodiments, smartphones may include an app that transmits a unique identification used to adjust a count automatically maintained by a remote or local computer to determine the number of people entering or leaving a predefined area. The occupancy level may allow the determination of whether the capacity of the predefined space has been exceeded. Such determinations may be indicated by generating an alarm. Detection of occupancy is useful in many applications such as space monitoring in schools or other buildings, fire evacuation, burglary detection, security purposes, detection of unauthorized presence, starting video cameras in a space to start recording events, calling security staff, space preparation (turning on lights, heat, etc.), space overflow estimation, and other applications.

18 Claims, 5 Drawing Sheets

PREMISE OCCUPANCY DETECTION BASED ON SMARTPHONE PRESENCE

TECHNICAL FIELD

This application relates generally to occupancy detection in small spaces. More specifically, this application relates to a method and apparatus for detecting the presence and/or the number of people within a predefined distance of a center or a defined space based on smartphone presence.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references detection of number of persons in a room, it will be appreciated that the disclosure may be applicable to counting people in a multiple-room building, public places like movie theaters and schools, and the like.

Briefly described, a method and an apparatus are disclosed for dynamically detecting and updating occupancy of a predefined space based on the presence of smartphones carried by people. In some embodiments, smartphones may include an app (small software application) that transmits a unique identification that may be used to increases or adjust a count automatically maintained by a remote or local computer to determine the number of people entering or leaving a predefined area. The occupancy level may allow the determination of whether the capacity of the predefined space has been exceeded. Such determinations may be indicated by generating an alarm or alert. Detection of occupancy may be useful in many applications such as space monitoring in schools or other buildings, fire evacuation, car occupancy detection, burglary detection, security purposes, detection of unauthorized presence, triggering or starting video cameras in a space to start recording events, calling security staff, space preparation (turning on lights, heat, etc.), space overflow estimation, and other applications.

Facilities and building monitoring and control is an important element of facilities management. Many techniques are used to monitor facilities such as cameras, motion detectors, light sensors, and the like. However, each of these techniques have some shortcomings in various situations. For example, motion detectors only detect motion. A person hidden from the line of sight of such devices can easily elude them. Similarly, detection by cameras can be circumvented in various ways, especially if they are not being monitored by someone. Therefore, there is a need for a technique of detection that can overcome these difficulties and provide additional detection capabilities, such as estimating the total number of people in a closed space, in a non-intrusive, cost-effective, and reliable manner.

Illustrative Operating Environment

Figure 1:
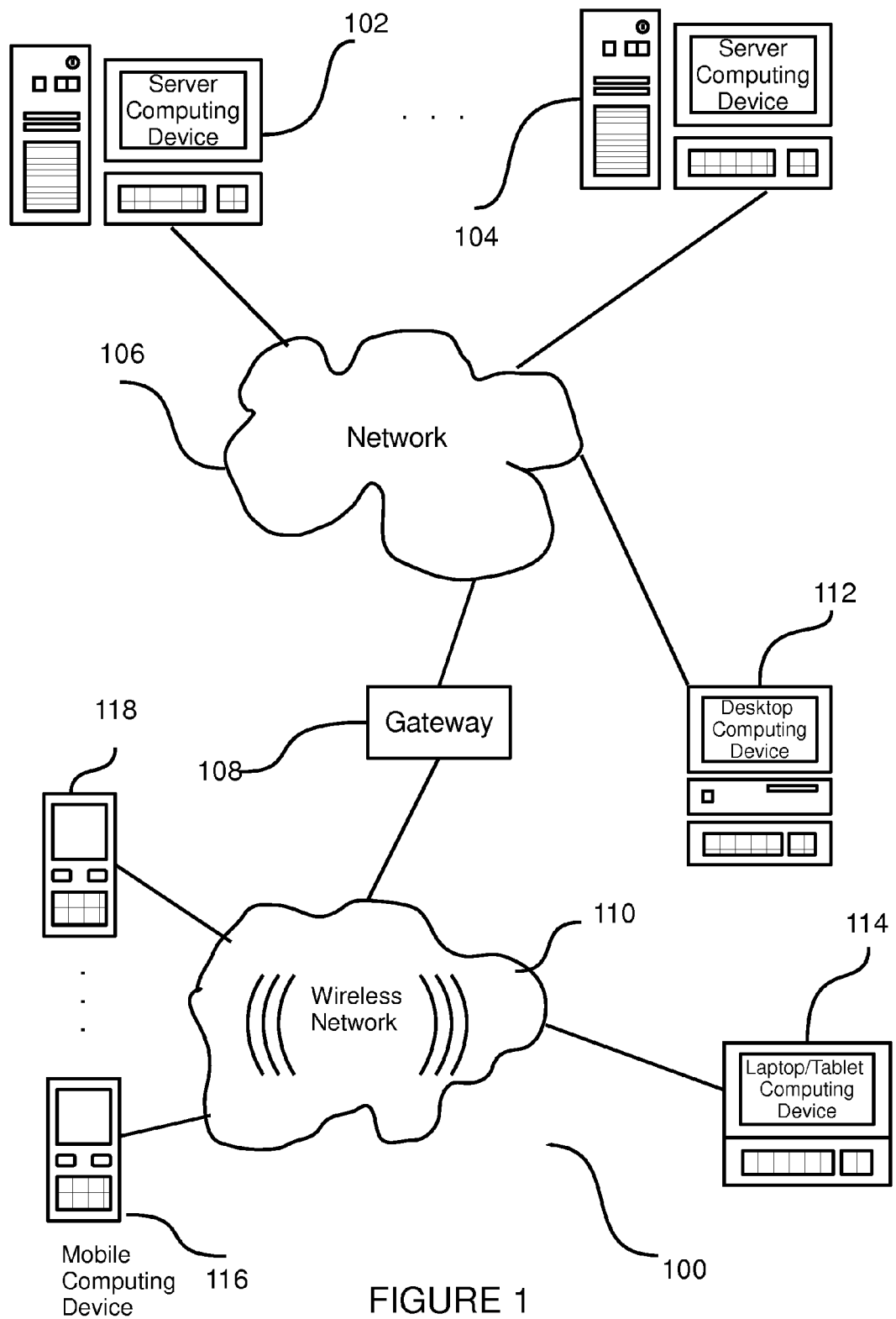
FIG. 1 shows an embodiment of a network computing environment wherein the disclosure may be practiced.

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 12-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, Bluetooth Low Energy (LE), High Speed Downlink Packet Access (HS-DPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

In various embodiments, the arrangement of system 100 includes components that may be used in and constitute various networked architectures. Such architectures may include peer-to-peer, client-server, two-tier, three-tier, or other multi-tier (n-tier) architectures, MVC (Model-View-Controller), and MVP (Model-View-Presenter) architectures among others. Each of these are briefly described below.

Peer to peer architecture entails use of protocols, such as P2PP (Peer To Peer Protocol), for collaborative, often symmetrical, and independent communication and data transfer between peer client computers without the use of a central server or related protocols.

Client-server architectures includes one or more servers and a number of clients which connect and communicate with the servers via certain predetermined protocols. For example, a client computer connecting to a web server via a browser and related protocols, such as HTTP, may be an example of a client-server architecture. The client-server architecture may also be viewed as a 2-tier architecture.

Two-tier, three-tier, and generally, n-tier architectures are those which separate and isolate distinct functions from each other by the use of well-defined hardware and/or software boundaries. An example of the two-tier architecture is the client-server architecture as already mentioned. In a 2-tier architecture, the presentation layer (or tier), which provides user interface, is separated from the data layer (or tier), which provides data contents. Business logic, which processes the data may be distributed between the two tiers.

A three-tier architecture, goes one step farther than the 2-tier architecture, in that it also provides a logic tier between the presentation tier and data tier to handle application data processing and logic. Business applications often fall in and are implemented in this layer.

MVC (Model-View-Controller) is a conceptually many-to-many architecture where the model, the view, and the controller entities may communicate directly with each other. This is in contrast with the 3-tier architecture in which only adjacent layers may communicate directly.

MVP (Model-View-Presenter) is a modification of the MVC model, in which the presenter entity is analogous to the middle layer of the 3-tier architecture and includes the applications and logic.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Illustrative Computing Device Configuration

Figure 2:
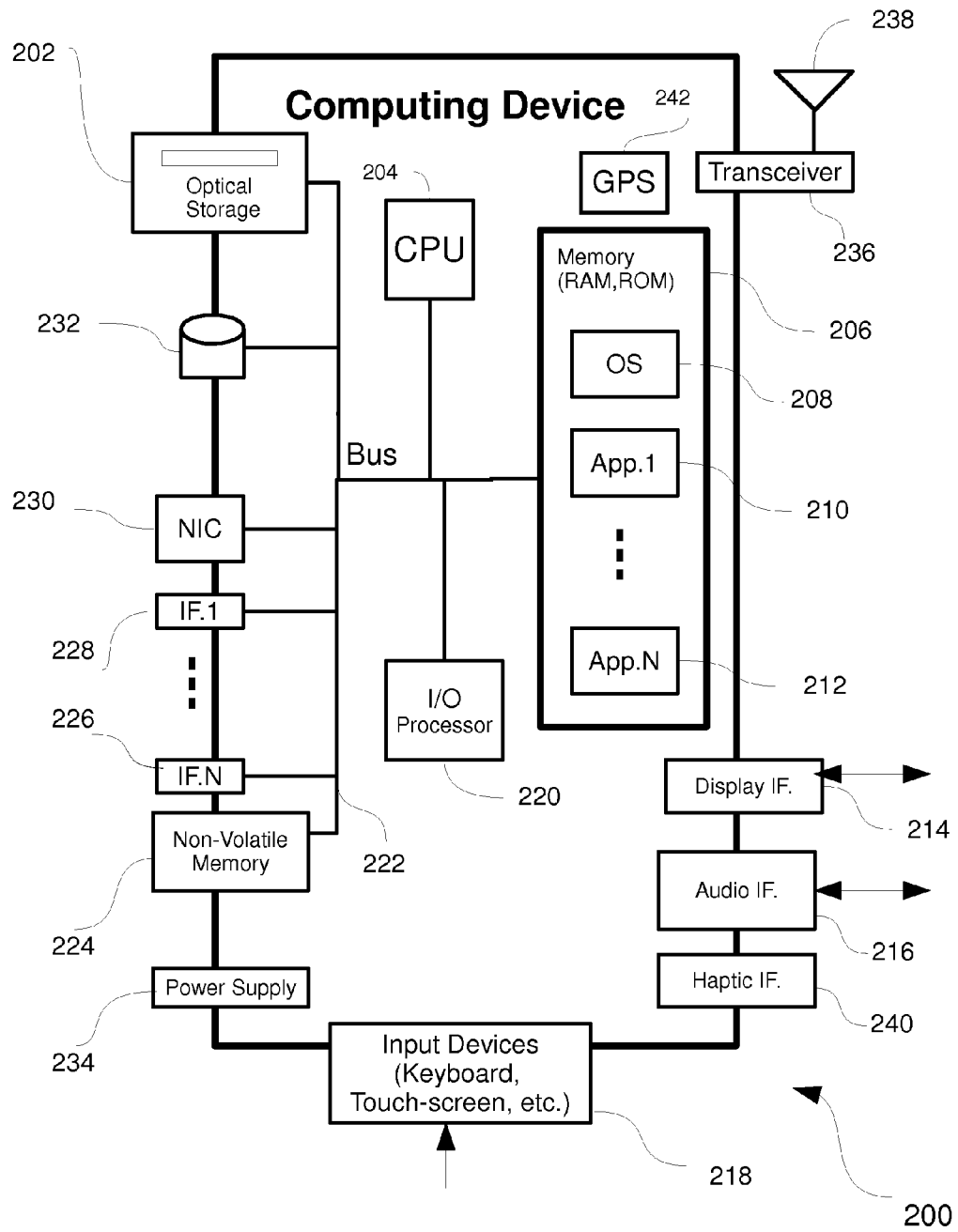
FIG. 2 shows an embodiment of a computing device that may be used in the network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs and/or software modules/components 210-212. Such software modules and components may be stand-alone application software or be components, such as DLL (Dynamic Link Library) of a bigger application software. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client-side and/or mobile communication operating system such as Windows Mobile™, Android®, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC (Media Access Control) address.

Figure 3:
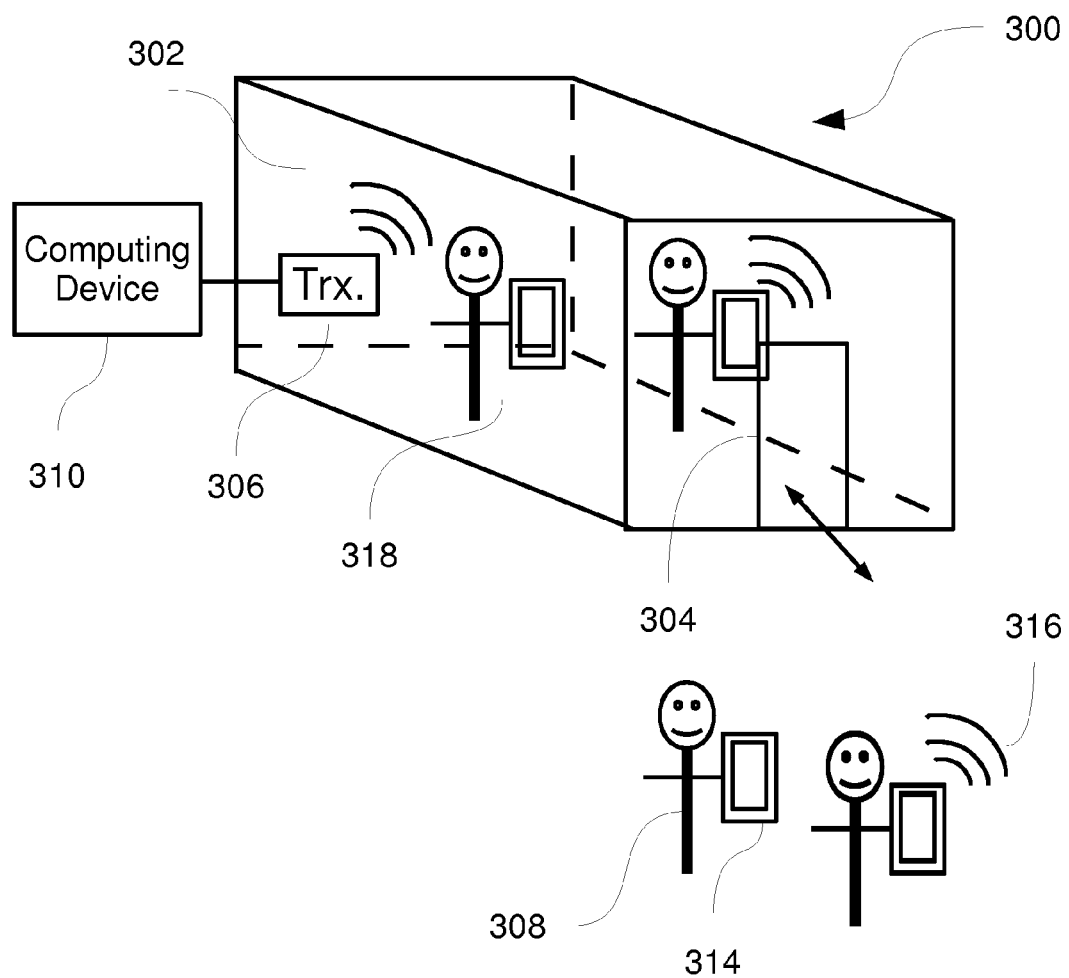
FIG. 3 shows an example predefined space with several occupants, each having a smartphone.

FIG. 3 shows an example predefined space with several occupants, each having a smartphone. In various embodiments, occupancy detection system 300 includes predefined space 302, entry 304, wireless transceiver or base station 306, computing device 310, occupants 318, and outside users 308 having smartphones 314 to transmit signals 316.

In various embodiments, the predefined space 302 may be a physical enclosure, an physically open or closed space, or any area with defined boundaries. The boundaries may be defined by a radial distance programmed within the base station. For example, the programmed radial distance may be 12 meters with respect to the base station. Any smartphone within this radial distance is considered to be within the predefined space. In other embodiments, the boundaries may be defined by transmission distance limitations. For example, if a Bluetooth communication protocol or device is used for transmission of IDs, then the boundary of the predefined space is automatically defined and limited by the transmission distance capabilities of the communication device.

In various embodiments, base station 306 is coupled with a local or remote computing device 310. In various embodiments, the base station may be a transceiver used to detect and capture signals sent by smartphones 314 of occupants within the predefined space 302, while in other embodiments, it may be a telecommunication device that is configured to act as a receiver for signals emitted by random phone devices other than phones normally associated with or belonging to the telecommunication device. In other embodiments, the base station 306 may be a computer itself configured to receive signal from random smartphones and make any calculations including statistical calculations and occupancy count update.

In various embodiments, computing device 310 may be any of the device shown in FIGS. 1 and 2 and may include one or several computers. In various embodiments, it may be a telecommunication device, an electronic controller including hardware and software modules, s a Personal Computer (PC), a combination of hardware and software, or other similar computing devices. In some embodiments, the computing device 310 may be integrated with the base station 306 to create a single integrated unit that receives ID information and performs any calculations based on such ID information, as described herein.

In various embodiments, smartphones are associated with users 308 and 318 as shown in FIG. 3. Each such smartphone may include an ID generation app, downloaded by the user or preinstalled by the manufacturer or other third party service providers, that is configured to broadcast a signal including a unique identification of the smartphone and/or its owner. The unique ID can be based on a GUID (Globally Unique ID) generator, MAC address of the phone network card, time and date, a combination of the above, or any other technique for producing a consistent and unique ID. The ID may be used by the base station 306 to detect the presence of the smartphone and, by reasonable presumption, the presence of the user/owner of the phone.

In various embodiments, the app on the smartphone may periodically or continuously broadcast the ID so if the phone user happens to be in the proximity of the base station or within the predefined space, his presence is detected by the base station. In other embodiments, a polling technique may be employed in which the base station may continuously or periodically broadcast an interrogation signal to any smartphones that have the ID generation app to respond with its ID.

Those skilled in the art will appreciate that in various embodiments, the occupancy detection system 300 may be implemented by a hardware and/or software system using one or more software components executing on the illustrative computing device of FIG. 2. The base station and the smartphone may include collaborating and/or corresponding software application modules that communicate with each other via a public or proprietary protocol or algorithm to allow the generation, transmission, and detection of the ID information. One or more functions may be performed by each software module recorded on a medium such as an optical disk, magnetic tape, volatile or non-volatile computer memory, and the like, or transmitted by various communication techniques using various network and/or communication protocols, as described above with respect to FIG. 1. For example one or more separate software components may be used for each of the functions in the system such as a unique ID generation module in the smartphone, an ID detection module in the base station, occupancy count maintenance module, communication module to transmit data to a remote computer, a statistical data generation module, a demographic analysis module, statistical analysis module, and the like as described herein. Those skilled in the art will appreciate that one function may be implemented using multiple software modules or several functions may be implemented using one software module. With further reference to FIG. 2, these software modules are generally loaded into the memory module 206 of the computing device for execution.

In various embodiments, the ID may only be a unique identifier used in counting the number of occupants within the predefined space, while in other embodiments, the ID may also include other information that allow various analysis instead of or in addition to counting the number of occupants in the predefined space. Such information may include non-identifying information that maintain reasonable privacy and cannot be used to directly or definitely identify an occupant but nevertheless provide valuable data such as age, sex, ethnic background, occupation, city of residence, and the like. The ID may include personal information that can be used to identify the smartphone holder such as name, preferences of food or other goods and services, and the like. These additional information that may be included in the ID transmitted by the smartphone may be used for demographic and statistical analysis of a particular space such as a shopping mall or sports club. While user-identifying information may be used to prepare the space for the person such as change the temperature of a particular room or office, prepare coffee, turn on lights, provide tailored advertisements for goods and services of interest to the particular user so identified within the predefined space, and the like.

In various embodiments, the occupancy detection system may be deployed within a private space such as a family house or a small business office. In such private environments, the occupancy detection system may be used to monitor the status of occupancy in a desired space, such as when children come home from school or when office workers check in and check out. Additional services such as turning lights on and off or adjusting temperature of a room may also be provided by detecting when a particular person enters the premises. In these private settings the base station may be a telecommunication device that provides functions for registering smartphones with it for monitoring purposes.

In various embodiments, the computing device 310 may perform any kind of processing and computation on the data contained within the ID such as statistical analysis, threshold calculations, estimation of number of occupants, time-stamping various events such as points when multiple people come in or leave, issuing alarms or notifications for unauthorized access to a space to police or security personnel, controlling other devices such as opening or closing vents, starting or shutting off air handling systems like air conditions, and the like. Detection of occupancy may be useful in many applications such as space monitoring in schools or other buildings, fire evacuation, car occupancy detection, burglary detection, security purposes, detection of unauthorized presence, triggering video cameras in a space to start recording events, calling security staff, space preparation (turning on lights, heat or climate control equipment, etc.), space overflow estimation, and other applications.

Figure 4:
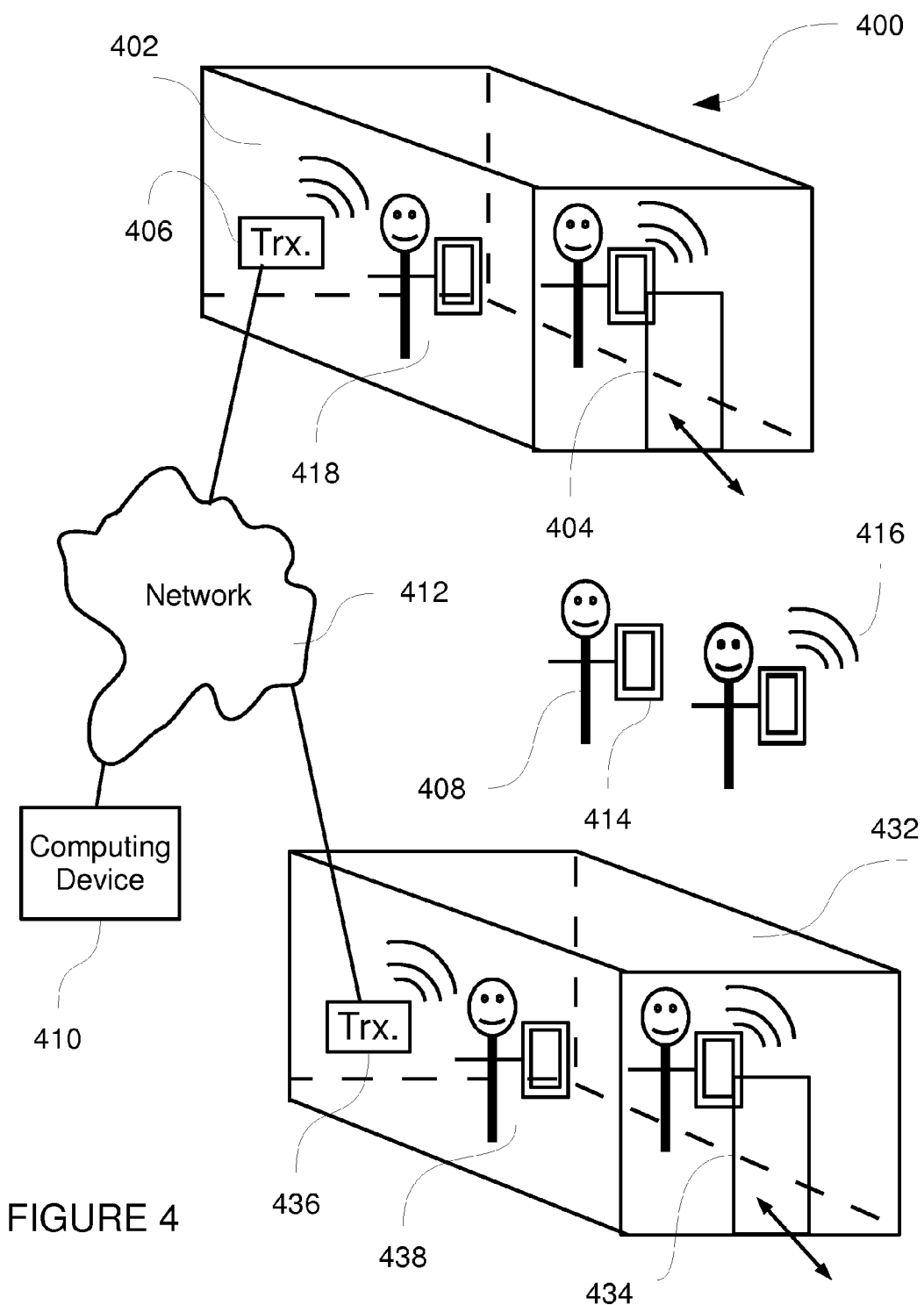
FIG. 4 shows several example predefined spaces coupled to a computer network, each space having several occupants, each occupant having a smartphone.

FIG. 4 shows several example predefined spaces coupled to a computer network, each space having several occupants, each occupant having a smartphone. In various embodiments, occupancy detection system 400 includes multiple predefined spaces 402 and 432 with entries 404 and 434, respectively, wireless transceivers or base stations 406 and 436, computing device 410 coupled with the base stations via a computer network 412, occupants 418 and 438, and outside users 408 having smartphones 414 to transmit signals 416.

In various embodiments, the elements of occupancy detection system 400 are similar to those of occupancy detection system 300 described above with respect to FIG. 3, with the addition of a computer network that allows the information from multiple pre-defined spaces 402 and 432 to be integrated into a more comprehensive database. Such arrangements may be useful for larger enterprises for statistical analysis and monitoring of the status and operation of their multiple facilities. Examples of such enterprises include government offices, university campuses, large corporations, hospitals and healthcare facilities, shopping centers, hotels and resorts, and the like.

In various embodiments, the communication linkage between the smartphones, base stations, and remote computers may be wireless or wired as described with respect to FIG. 1 above. Each predefined space may also include one or more base stations depending on the size of the space and the transmission power of the base station.

Figure 5:
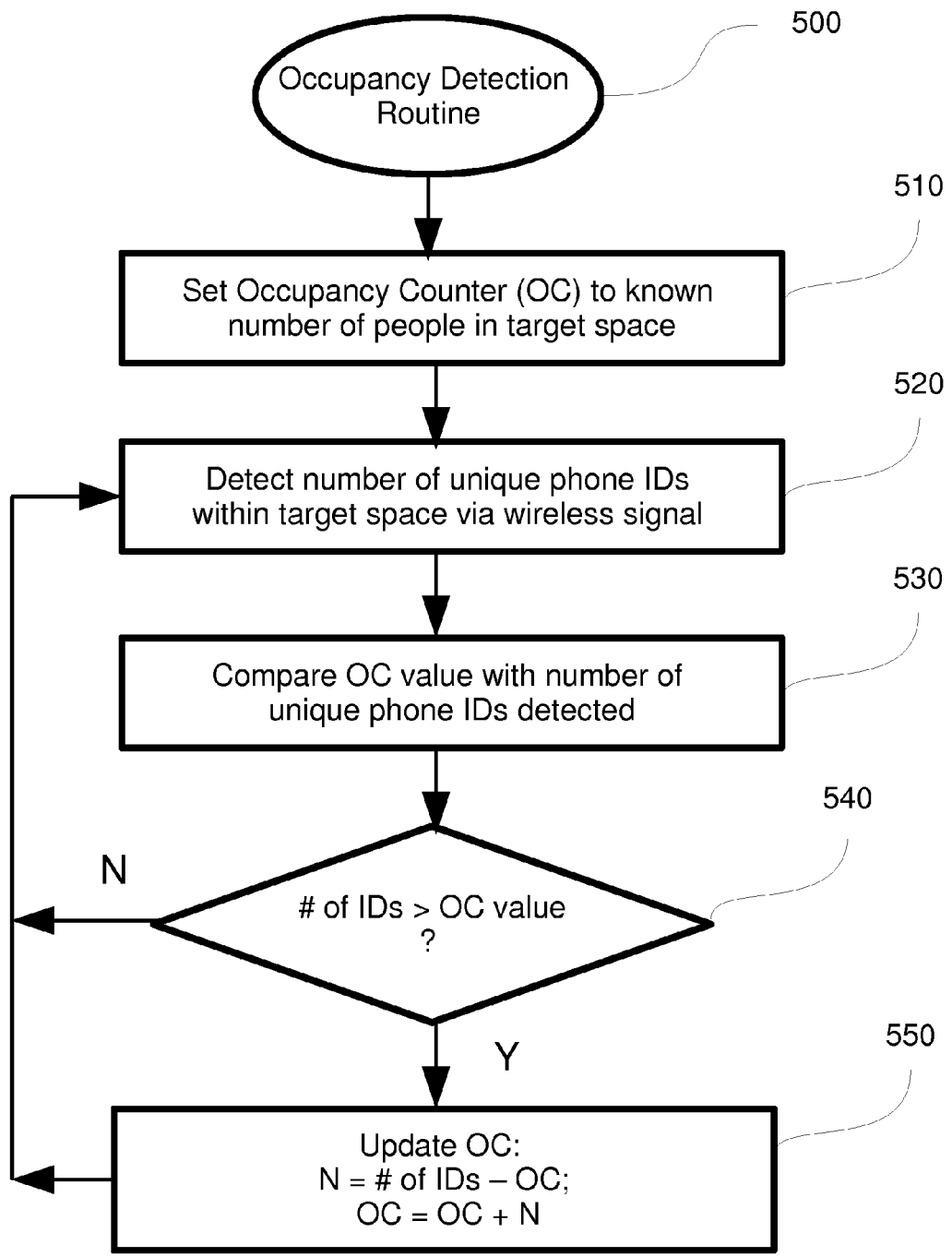
FIG. 5 shows an example flow diagram for the process of approximating the number of occupants in a predefined space by detecting smartphone signals.

FIG. 5 shows an example flow diagram for the process of approximating the number of occupants in a predefined space by detecting smartphone signals. In various embodiments, an occupancy detection routine starts at block 500 and proceeds to block 510.

At block 510, set the occupancy counter for the target predefined space to the current number of occupants. This initial setting may be based on detection of smartphones within the space or be programmed in as a starting point by a human operator. The routine proceeds to block 520.

At block 520, the smartphone IDs transmitted via an app on the smartphone are collected by the base station and maintained as part of a running count of occupants. In various embodiments, the app may periodically broadcast the ID so if the phone user happens to be in the proximity of the base station within the predefined space, his presence is detected by the base station and the ID is recorded. In other embodiments, a polling technique may be used in which the base station may periodically broadcast an interrogation signal to any smartphones that have the ID generation app to respond with its ID. The routine proceeds to block 530.

At block 530, the occupancy count is compared with the total collected IDs to see if the occupancy has decreased or increased. In some embodiments, a time stamp may be associated with each increase or decrease of the occupancy count to allow the construction of a time-based occupant flow diagram, in which the flow of people in and out of the predefined space may be charted on the diagram showing number of people within the space as a function of time. The routine proceeds to decision block 540.

At decision block 540, it is determined whether the total number of IDs collected by the base station exceeds the current occupancy count. If the total number of IDs is the same as the current occupancy count proceed back to block 520, otherwise proceed to block 550.

At block 550, update the occupancy count by adding or subtracting the difference between the current occupancy count and the total number of IDs.

The routine does not normally terminate and continuously performs the above functions until it the system is shut down.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the disclosure.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems which perform the specified actions or steps, or combinations of special purpose hardware and computer instructions.

It will be further understood that unless explicitly stated or specified, the steps described in a process are not ordered and may not necessarily be performed or occur in the order described or depicted. For example, a step A in a process described prior to a step B in the same process, may actually be performed after step B. In other words, a collection of steps in a process for achieving an end-result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A system for detecting occupancy in a target space, the system comprising:
    a target predefined space;
    a base station within the target predefined space to receive information via wireless communications from smartphones physically located within the target predefined space; and
    a computing device coupled with the base station, and configured to calculate an occupancy count based on the information received from the base station, wherein the received information comprises smartphone identification information collected by polling smartphones by the base station.

2. The system of claim 1, wherein the received information further comprises demographic information including at least one of sex, age, ethnic background, and occupation.

3. The system of claim 1, wherein the target predefined space is defined by transmission distance capabilities of the base station.

4. The system of claim 1, wherein the computing device is further configured to take an action including one or more of issuing an alarm, recording occupancy data with timestamp of events in a database, and generating an occupancy curve versus time.

5. The system of claim 1, wherein the computing device is further configured to control other devices associated with the target predefined space, including turning on a video camera, turning on a light, and controlling climate control equipment.

6. The system of claim 1, wherein the computing device is further configured to detect the entry or exit of an occupant from the target predefined space.

7. The system of claim 1, wherein the computing device is further configured to generate statistical and demographic data associated with the target predefined space.

8. A method of detecting occupancy in a target space, the method comprising:
    transmitting smartphone identification information on a periodic basis by smartphones;
    maintaining an occupancy counter by a base station within the target space;
    receiving by a base station the smartphone identification information; and
    determining an occupancy count of the target space by comparing a value of the occupancy counter with a total number of smartphone identifications received by the base station.

9. The method of claim 8, further comprising polling the smartphones by the base station to transmit the smartphone identification information.

10. The method of claim 8, further comprising transmitting additional information with the smartphone identification information including non-identifying information about sex, age, and ethnic background of smartphone owners.

11. The method of claim 8, further comprising issuing an alarm if it is determined that an occupancy limit of the target space is exceeded.

12. The method of claim 8, further comprising controlling other devices associated with the target space, including turning on a video camera and turning on or off an climate control equipment.

13. The method of claim 8, wherein transmitting smartphone identification information comprises using a software application installed on the smartphones to generate and transmit the smartphone identification information.

14. The method of claim 8, wherein determining an occupancy count comprises wireless transmission of smartphone identifications by the bases station to a computing device to calculate the occupancy count.

15. A method of detecting occupancy in a plurality of target spaces, the method comprising:
    transmitting smartphone identification information on a periodic basis by smartphones;
    maintaining an occupancy counter by a plurality of base stations, each base station being within one of the plurality of target spaces;
    receiving by the plurality of base stations the smartphone identification information from the smartphones;
    transmitting by the plurality of base stations, via a computer network, the smartphone identification information to a remote computer; and
    determining an occupancy of each of the plurality of target spaces by comparing a value of the occupancy counter of each of the plurality of base stations with a total number of smartphone identifications received by each of the plurality of base stations from smartphones within each of the corresponding plurality of target spaces.

16. The method of claim 15, further comprising issuing an alarm if it is determined that a capacity of one of the plurality of target spaces is exceeded.

17. The method of claim 15, further comprising controlling other devices associated with the target closed space, including turning on a video camera and turning on or off a climate control unit.

18. The method of claim 15, wherein transmitting smartphone identification information comprises polling the smartphones by each of the plurality of base stations.

* * * * *